July 2, 1963  J. R. OISHEI ETAL  3,095,596
WINDSHIELD CLEANING APPARATUS
Filed July 30, 1959  2 Sheets-Sheet 1

INVENTOR.
JOHN R. OISHEI and
MARTIN BITZER
BY
Bean Brooks Buckley & Bean
ATTORNEYS July 2, 1963     J. R. OISHEI ETAL     3,095,596
WINDSHIELD CLEANING APPARATUS
Filed July 30, 1959                      2 Sheets-Sheet 2
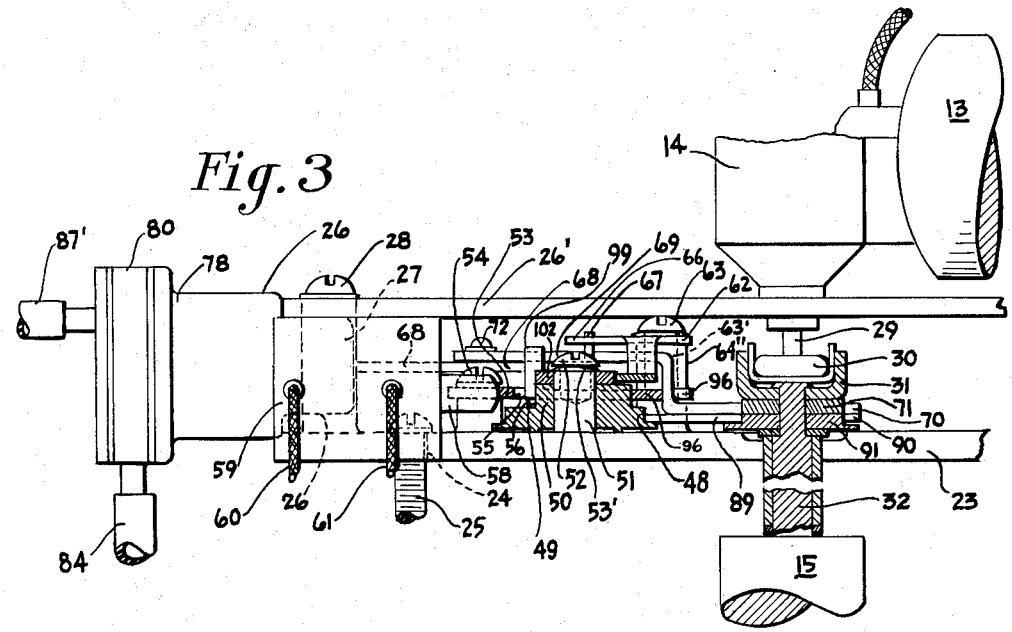
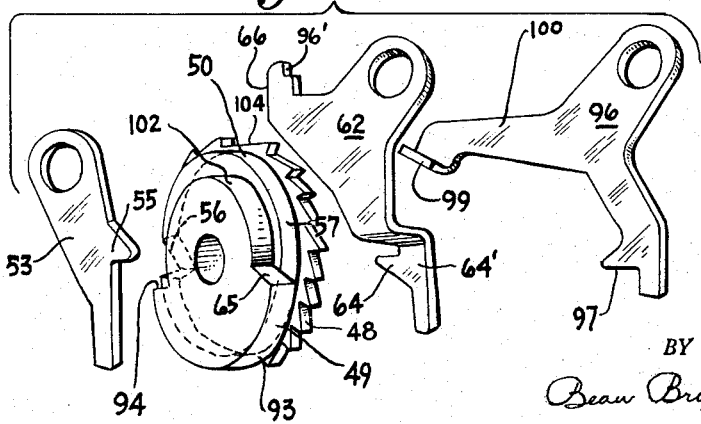
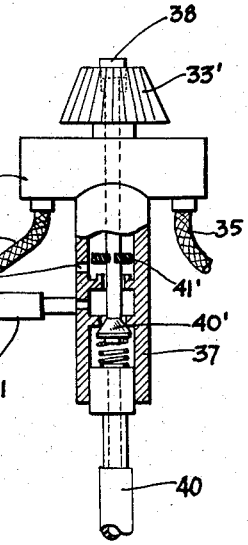
INVENTOR.
JOHN R. OISHEI and
MARTIN BITZER
BY
Bean Brooks Buckley & Bean.
ATTORNEYS

United States Patent Office 3,095,596
Patented July 2, 1963

3,095,596
WINDSHIELD CLEANING APPARATUS

John R. Oishei, Buffalo, and Martin Bitzer, Kenmore, N.Y., assignors to Trico Products Corporation, Buffalo, N.Y.
Filed July 30, 1959, Ser. No. 830,543
3 Claims. (Cl. 15—250.02)

The present invention relates to an improved windshield cleaning system of the type which cleans a windshield by providing joint action of a solvent and windshield wipers thereon.

It is the primary object of the present invention to provide a self-contained combined windshield washer pump and timing unit which may be installed as an adjunct of and which is adapted to be driven by a windshield wiper motor of any type for the purpose of providing, in precise timed relationship, a predetermined number of squirts of solvent and a predetermined number of cycles of wiper operation during a windshield cleaning operation.

Another object of the present invention is to provide a completely mechanical self-contained combined windshield washer pump and timing unit of the above-described type which is low in cost, easy to install, and dependable in operation.

A further object of the present invention is to provide a self-contained combined washer pump and timing unit of the above type which is economical because it may be installed either by a vehicle owner or at the factory, in either event without in any way interfering with normal operation of any of the windshield wiper motors with which it may be used. Other objects and attendant advantages of the present invention will be more readily perceived hereafter.

The improved windshield cleaning arrangement of the present invention consists of a completely mechanical self-contained combined solvent pump and timing unit which is adapted to be actuated solely in response to the mechanical output of a wiper unit to provide a coordinated windshield cleaning operation. Therefore, the self-contained unit can be used equally well in conjunction with wiper motors of the electric, pneumatic, or hydraulic types. In accordance with the present invention a base member containing a washer pump and mechanical timing mechanism is adapted to be positioned proximate the wiper unit and coupled to the output thereof. When a washing operation is desired, the vehicle operator need merely momentarily actuate a control which initiates action of the timing mechanism on the base member to place the wiper motor in operation and couple the motor output to the washer pump. As the wiper motor operates, it will drive the pump and cause it to provide an intermittent stream of solvent to the windshield. The timing mechanism will maintain the washer pump in operation for a predetermined number of strokes of the windshield wipers and then terminate operation of the washer pump. The construction of the washer pump is such that it stops after it has taken in a charge of solvent so that it will be able to project the solvent immediately upon the initiation of a subsequent windshield cleaning cycle. The timing mechanism positively maintains the wiper motor in operation for a predetermined number of wiper strokes after the termination of washer pump operation to wipe the windshield to a dry, clear state and thereafter causes the wiper motor to terminate operation. Whenever the wiper motor is actuated by itself, the above-described combined timing and pumping mechanism will remain dormant and will in no way interfere with normal operation of the wiper motor.

It will readily be appreciated that the self-contained unit which contains the timing mechanism and the washer pump may easily be applied as an adjunct to an existing wiper system to provide precise coordinated washer and wiper operation in an economical manner. Furthermore, either the wiper motor or the self-contained timing-pumping device may be readily replaced as a unit without requiring replacement of the other. The present invention will be more fully understood when the following portions of the specification are read in conjunction with the accompanying drawings wherein:

FIG. 3 is a view taken along line III—III of FIG. 2;

FIG. 4 is an exploded perspective view of certain portions of the timing structure of the present invention; and FIG. 5 is a view, partially in cross-section, of a control valve which may be used for actuating the system.

Figure 1:
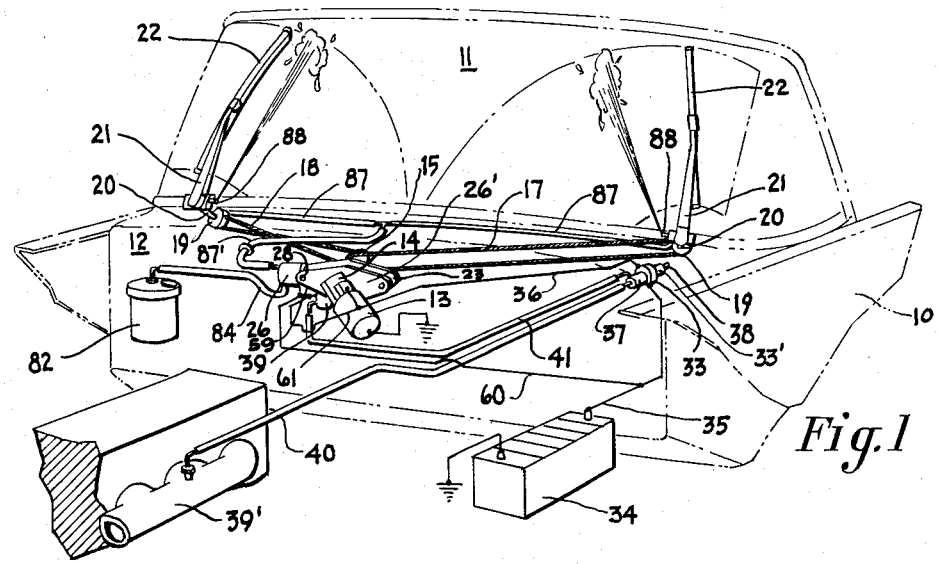
FIG. 1 is a fragmentary perspective view of an automotive vehicle incorporating the present invention.

In FIG. 1, an automotive vehicle 10 is shown having a windshield 11 mounted thereon. A wiper unit is provided which includes a motor 13 which is coupled to gear box 14 which, in turn, produces an oscillating motion which causes drum 15 to oscillate. The oscillation of drum 15 is transmitted to pulleys 19 through cables 17 and 18. Pulleys 19, in turn, are mounted on rockshafts 20 which, in turn, mount wiper arms 21 which carry wiper blades 22. As is well-known in the art, whenever the wiper unit is placed in operation, wiper motor 13, which is suitably mounted on firewall 12 or underneath the vehicle dashboard, will cause blades 22 to oscillate across the windshield.

In accordance with the present invention, the self-contained timing and pumping unit includes a base member 23 (FIGS. 1, 2, and 3) having apertures 24 therein for receiving screws 25 which affix the base member to mounting structure (not shown) on the vehicle. Base member 23, which may be in the form of a plate, carries the mechanism which both coordinates operation of the windshield washer and the wiper motor as well as timing the duration of operation of each and also carries a washer pump unit 26 for projecting an interrupted stream of solvent under high pressure onto windshield 11. The wiper motor 13 is mounted on a bracket 26' which is adapted to be secured to lugs 27 on base 23 by screws 28. It is to be noted that shaft 29 (FIG. 3) extending from gear box 14 has a rectangular universal driver member 30 attached thereto which is adapted to be received in channel 31 fixedly secured to shaft 32 which is journalled in base 23. It will therefore readily be appreciated that whenever motor 13 causes gear box 14 to produce oscillation of shaft 29, drum 15 will oscillate correspondingly to drive wipers 22 in the abovedescribed manner.

Whenever it is desired to cause the wiper unit to operate without the washer to clear the windshield during rainy weather, it is only necessary to manipulate knob 33' (FIG. 5) to close single-pole single-throw switch 33 for the purpose of causing current to flow from battery 34 to electric motor 13 through leads 35 and 36, it being appreciated that both the battery and motor are grounded to complete the circuit. Switch 33 forms a part of a combined washer and wiper switch (FIG. 5) but it will readily be understood that it may be separate therefrom if desired.

Figure 2:
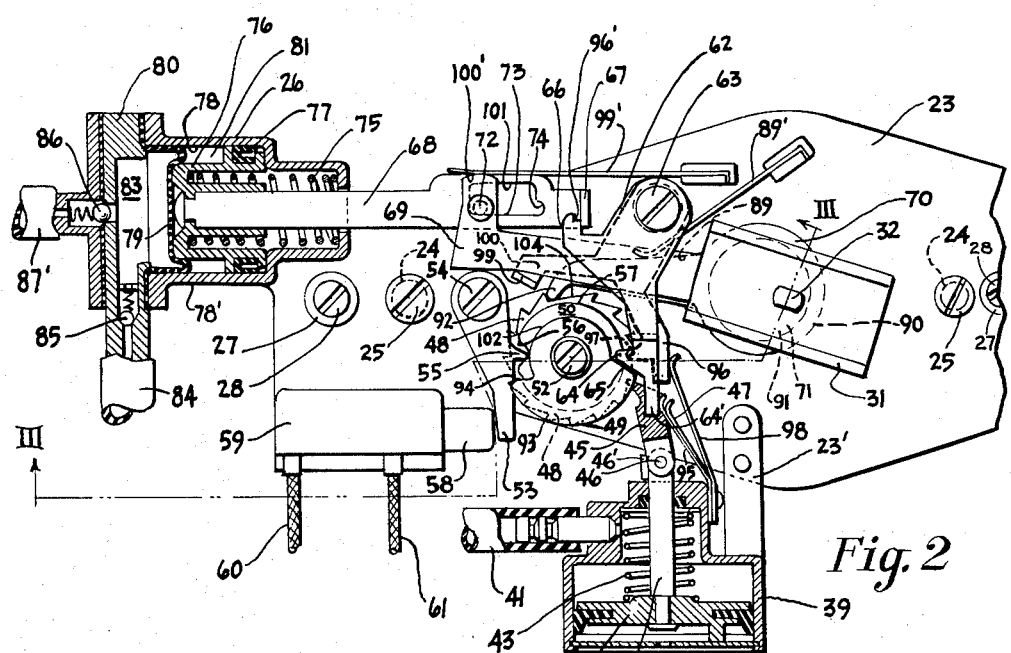
FIG. 2 is an enlarged view in elevation showing the improved structure of the present invention.

Whenever it is desired to effect a windshield cleaning operation, button 38 of switch 37 (FIGS. 1 and 5) is momentarily depressed to unseat valve 40' and seat valve 41' to permit manifold vacuum to communicate with fluid pressure motor 39 through conduits 40 and 41 which extend between an upsetting motor 39 and manifold 39'. Motor 39 (FIG. 2) is attached to base member 23 by bracket 23'. The evacuation of motor 39 in the above-described manner will cause piston 42 therein to be drawn upwardly against the bias of spring 43, and this upward movement will be accompanied by a corresponding upward movement of motor shaft 44 affixed to piston 42. Affixed to the end of shaft 44 which is remote from piston 42 is a pawl 45 adapted to pivot about pin 46 coupling the pawl to the shaft. A positive stop 46', extending from shaft 44, may be provided between pawl 45 and shaft 44 to limit movement of the pawl in a counterclockwise direction. A spring 47 is mounted on the housing of motor 39 and tends to bias pawl 45 in a counterclockwise direction (FIG. 2). Whenever motor 39 is actuated in the foregoing manner, pawl 45 will engage one of the teeth of ratchet wheel 48, which is integrally formed with cams 49 and 50 thereon. The ratchet-cam assembly or unit 48-49-50 is journalled for rotation on stub shaft 51 extending from base member 23, where it is held in position by screw 52 and spring washer 53'. Ratchet-cam assembly 48-49-50, in conjunction with cam followers described hereafter, constitutes a timing-coordinating arrangement for determining both the length and relative times of operation of both the washer pump and wiper unit.

The upward movement of pawl 45 in the foregoing manner will cause counterclockwise movement of ratchet-cam assembly 48-49-50 a distance of one ratchet tooth. This is sufficient to cause cam follower arm 53 (FIGS. 2 and 4) to pivot in a clockwise direction (FIG. 2) about screw 54 which secures it to base member 23. The foregoing action is obtained because protuberance 55 of follower 53 will move from notch 56 in cam 50 onto the portion 57 thereof, which is concentric with the axis of rotation of the cam. The foregoing movement of cam follower 53 will result in the end thereof, which is remote from screw 54, engaging stem 58 of microswitch 59 which is mounted on base member 23. When microswitch 59 is closed in the foregoing manner, a circuit will be completed from battery 34 to wiper motor 13 through leads 35 and 60, microswitch 59, and lead 61, it being appreciated that the required ground connections are provided, as shown. In the foregoing manner, operation of wiper motor 13 is initiated.

When button 38 of washer switch 37 is released, the latter returns to the position shown in FIG. 5 and conduit 41 which is in communication with the atmosphere through vent 47' in switch 37 will cause motor 39 to be vented. This will permit motor spring 43 to cause piston 42 to return to the position shown in the drawing. It will readily be appreciated, however, that a Bowden wire unit (not shown) or any other mechanical type of connection may be utilized for providing movement of ratchet wheel 48 a distance of one tooth in a counterclockwise direction.

Substantially simultaneously with the energization of motor 13 in the above-described manner, washer pump 26 is energized. This is effected because counterclockwise movement of ratchet-cam assembly 48-49-50 will cause bell crank cam follower 62 to pivot in a counterclockwise direction about stub shaft 63'. This movement of cam follower 62 is effected because protuberance 64 thereon will ride up inclined surface 65 to cause leg 66 thereof to move downwardly and disengage flange 67 of pump shaft 68.

When pump shaft 68 is released, a squirt of solvent will be caused to be projected from pump 26 onto windshield 11 because a quantity of solvent is stored in the pump at the termination of a previous windshield cleaning cycle, as explained in detail hereafter. Once the wiper motor and washer pump are energized in the above-described manner, the oscillation of shaft 32 will cause arm 69 to actuate pump 26. In this respect it is to be noted that one end of arm 69 is in the form of a collar or strap 70 which encircles eccentric disc 71 mounted on shaft 32. The other end of arm 69 has a pin 72 extending perpendicularly from the plane thereof. It will therefore be readily appreciated that as shaft 32 oscillates back and forth in synchronism with the operation of motor 13, arm 69 will be caused to oscillate accordingly. Pin 72 extends within slot 73 of arm 68, and is normally declutched from the pump means 26 but is designed to be clutched or connected for coordinated action. Therefore, as arm 69 moves to the right, the pin 72 will engage the end 74 of slot 73 and move pump shaft 68 to the right also. This movement of shaft 68 to the right will be accompanied by the compression of spring 75 within pump 26 because this spring is interposed between piston 76, attached to shaft 68, and the end wall of the pump. When arm 69 moves to the left, pump shaft 68 will be caused to move to the left also as spring 75 expands. The connector parts 72, 73 may therefore be considered a part of the clutch or coupling between the pump means and the shaft 32. Mounted on piston 76 is a piston seal 77 which effects substantially fluid-tight contact between the wall 78 of pump 26 and piston 76, when the latter moves to the right. A flexible diaphragm 79 is securely fastened between housing portions 78' and 80. It will readily be appreciated that when piston 76 is moved to the right, diaphragm 79 will follow the piston because of the tendency of piston seal 77 to form a vacuum in chamber 81. When piston 76 moves to the right, solvent will be drawn from reservoir 82 (FIG. 1) into motor chamber 83 through conduit 84 and check valve 85. When piston 76 moves to the left under the urging of spring 75, check valve 85 will close and the solvent trapped in pump chamber 83 will be expelled past check valve 86 onto windshield 11 through conduits 87' and 87 and nozzles 88. It will thus be seen that oscillation of the windshield wiper blades 22 is accompanied by the synchronized intermittent projection of solvent onto windshield 11 because of the joint operation of the wiper motor and pump 26.

The foregoing joint action will continue for a predetermined number of cycles of wiper action. In this respect it is to be noted that a timing pawl 89 is adapted to coact with ratchet 48. More specifically, one end of timing pawl 89 is formed into a collar or strap 90 which fits about eccentric disc 91 secured to shaft 32. When shaft 32 oscillates back and forth in response to the operation of motor 13, the eccentric connection between it and eccentric 91 will cause pawl 89 to move back and forth, and spring 89' will bias pawl 89 into contact with ratchet 48. After the initial movement of ratchet wheel 48, as described above, the tip 92 (FIG. 2) of pawl 89 will engage each of the ratchet teeth in succession to drive ratchet 48 in a counterclockwise direction in steps. It will be noted that every time timing pawl 89 advances ratchet 48 a distance of one tooth, there will be a squirt of water from pump 26 because arm 69, which effects the intake stroke of pump 26, operates in synchronism with timing pawl 89. Therefore, as long as leg 66 of cam follower 62 permits pump shaft 68 to reciprocate in the above manner, there will be an intermittent projection of solvent onto the windshield. The leg 66 of cam follower 62 is held out of engagement with flange 67 of pump arm 68 as long as protuberance 64 (FIG. 4) of the cam follower rides on surface 93 of cam 49.

After a period of joint operation of the wiper motor and pump, a point will be reached in the intermittent counterclockwise movement of cam 49 when protuberance 64 of cam follower 62 drops off of the end of cam surface 93 at 94. This will cause cam follower 62 to pivot in a clockwise direction (FIG. 2) about the axis of screw 63 under the urging of spring 95. The surface 96' of leg 66 will therefore engage flange 67 of pump shaft 68 and hold it against movement to the left. Substantially simultaneously with this action, protuberance 97 of cam follower-bell crank lever 96 will drop into notch 56 of cam 50 and therefore cam follower 96 will pivot in a clockwise direction about the axis of stub shaft 63' on which it is mounted under the urging of spring 98. A flange 99 is affixed to the leg 100 of cam follower 96 and this flange lies under arm 69 which drives motor shaft 68. When cam follower 96 is pivoted in a clockwise direction (FIG. 2) in the above-described manner, flange 99 on leg 100 thereof will raise driving arm 69 against the bias of spring 99' which bears on end 100' of arm 69, so that pin 72 mounted thereon will approach top 101 of slot 73. It will be noted that the upper portion of slot 73 is shorter than the lower portion of the slot. Therefore, as driving arm 69 approaches its extreme right-hand position, pin 72 will engage the right upper end of slot 73 and move pump shaft 68 to the right. Accordingly, spring 95, which bears on the leg 64' of cam follower 62, will cause leg 66 thereof to move upwardly into full engagement with flange 67 of pump shaft 68 (FIG. 2) to hold the latter in a fully retracted position in which a charge of solvent is stored in chamber 83. The limit of movement of end 66 of cam follower 62 is determined when protuberance 64 thereof engages surface 102 of cam 49. The foregoing cooperating action between cam followers 62 and 96 occurs when notch 56 and portion 94 of cams 50 and 49, respectively, are in the vicinity of protuberances 64 and 97. Thereafter, during continued movement of ratchet 48 under the influence of timing pawl 89, protuberance 64 of cam follower 62 will ride on surface 102 of cam 49 and protuberance 97 of cam follower 96 will ride on concentric surface 57 of cam 50. In order to insure against binding of cam followers 96 and 62, a spacer 64" in placed therebetween on stub shaft 63', and screw 63 retains these elements in position.

Since the driving linkage between the wiper driven shaft 32 and pump shaft 68 is interrupted in the above-described manner by engaging flange 67 with end 66 of cam follower 62, the continued operation of motor 13 is not accompanied by washer pump action. In this manner, a dry wipe cycle is provided after the termination of solvent projection. This dry wipe cycle persists for a predetermined number of strokes, the exact number being determined by the number of teeth on ratchet 48 which have yet to be engaged by pawl 89 between the time that protuberance 64 returns to cam portion 102 and the time that protuberance 55 reaches notch 56. When protuberance 55 of cam follower 53 again falls into notch 56 of cam 50, a spring (not shown), which biases stem 58 of microswitch 59 to the right, will cause cam follower 53 to return to the position shown in FIG. 2. At this time, the circuit to the electric motor 13 will be broken and wiper operation will cease. After the circuit to electric motor 13 is broken in the above-described manner, automatic parking mechanism (not shown) will park the windshield wipers, as is well known in the art.

It is to be noted that when protuberance 55 of cam follower 53 returns to the position shown in FIG. 2 to terminate operation of electric motor 13, end 92 of timing pawl 89 will come to rest on elongated tooth 104 of ratchet 48. The function of this elongated tooth is to permit the electric motor 13 to drive wipers 22 without the accompanying operation of washer pump 26. More specifically, in the event that the wiper motor is placed in operation alone, as described in detail above, the oscillation of shaft 32 will be accompanied by a corresponding oscillation of timing pawl 89 and pump actuating arm 69. However, tooth 104 of ratchet 48 is longer than the stroke of timing pawl 89 and therefore the end 92 thereof will slide back and forth on the top of tooth 104 without engaging the dependent portion of the tooth to provide the coordinated operation between the washer and wiper, as described above. Furthermore, the reciprocation of pin 72 within slot 73 of pump shaft 68 will in no way actuate the latter because, as noted in detail above, leg 66 of cam follower 96 moves slot 73 to the right beyond the normal length of travel of pin 72. It is to be further noted that coordinated washer-wiper operation can be obtained only by energizing fluid pressure motor 39 to cause initial movement of ratchet 48, as described in detail above.

It will be especially noted that the coupling arrangement 30—31 which is utilized between the wiper motor and the shaft which carries driving drum 15, permits either an electric (as shown) or a hydraulic or pneumatic wiper motor to be utilized for providing the type of operation discussed in detail above.

It will further be appreciated that in lieu of microswitch 59, a pneumatic valve may be used if the motor is of the pneumatic type or a hydraulic valve may be used if the motor is of the hydraulic type. Even if the foregoing substitutions are made, it will readily be appreciated that they will in no way influence the basic mode of operation of the pumping and timing structure.

While preferred embodiments of the present invention have been disclosed, it is to be readily understood that the present invention is not to be limited thereto but may be otherwise embodied within the scope of the following claims.

What is claimed is:

1. A windshield cleaning system comprising a wiper unit including a wiper motor, a wiping element, and transmission means therebetween; a combined pump and coordinator unit constituting an entity separate and distinct from said wiper motor and adapted to be mounted proximate thereto; first control means for producing sole operation of said wiper unit without accompanying operation of said combined pump and coordinator unit; second control means for providing joint operation of said wiper unit and said combined pump and coordinator unit; said combined pump and coordinator unit comprising a base, a shaft journaled in said base, a pump including a pump shaft mounted on said base, means on said shaft adapted to be coupled to said wiper motor output whereby said wiper motor drives said shaft, eccentric disk means mounted on said shaft, a first strap mounted on said eccentric disk means, means for selectively coupling said first strap to said pump shaft, a second strap coupled to said eccentric disk means, a ratchet and cam assembly mounted for rotation on said base, a pawl driven by said second strap for engagement with said ratchet, means mounted on said base member and responsive to the manipulation of said second control means for rotating said ratchet and cam assembly, switch means adapted to be actuated incidental to rotation of said ratchet and cam assembly to thereby energize said wiper motor, means responsive to the rotation of said ratchet and cam assembly for coupling said pump shaft to said first strap and thereby causing the rotation of said shaft produced by the operation of said wiper motor to drive said pump to thereby provide a period of joint wiper motor and washer pump operation and thereafter terminate said connection thereby permitting said wiper motor to continue in operation without accompanying pump operation, said ratchet including means associated therewith to permit said wiper motor to operate without producing accompanying operation of said pump when said first control means are actuated.

2. A self-contained coordinating and pumping unit constituting an entity separate and distinct from a wiper motor and adapted to be installed as an adjunct thereof for providing a period of joint operation of a washer pump with said wiper motor comprising a base plate adapted to be mounted proximate said wiper motor, shaft means journaled on said base plate, means on said shaft means for engagement with the mechanical output of said wiper motor, first cam means mounted on said shaft means for being driven at all times while said wiper motor is in operation, cam follower means mounted in operative engagement with said first cam means and adapted to be driven thereby while said first cam means are driven, a washer pump mounted on said base plate, said washer pump including a solvent chamber with a movable wall and a pump rod operatively coupled to said movable wall, said pump rod including means for providing a lost-motion connection with said cam follower means, a ratchet wheel journaled on said base plate, second cam means adapted to be driven by said ratchet wheel, pawl means on said base plate, linkage means operatively coupling said mechanical output of said wiper motor to said pawl means to cause said pawl means to be driven while said wiper motor is in operation, means for normally preventing said pawl means from driving said ratchet wheel, latch means operatively associated with said pump rod and adapted to be actuated by said second cam means, said latch means in conjunction with said second cam means normally maintaining said pump rod in a position to permit said cam follower means to idle with respect to said pump rod through said lost-motion connection when said means prevent said pawl means from driving said ratchet wheel, and means for selectively causing said pawl means to drive said ratchet wheel, said second cam means disengaging said latch means in response to movement of said ratchet wheel to permit said cam follower means which are being driven by said shaft means to drive said pump rod to thereby effect pump operation as a result of the rotation of said shaft means effected by said wiper motor, said second cam means reengaging said latch means after a predetermined movement of said ratchet wheel effected by said pawl means, said means for preventing said pawl means from driving said ratchet wheel rendering said pawl means ineffective for driving said ratchet means after said second cam means cause said latch means on said pump rod to terminate the driving relationship between said cam follower means and said pump rod.

3. A windshield cleaning unit comprising a wiper motor; a self-contained coordinating and pumping unit constituting an entity separate and distinct from said wiper motor and adapted to be installed as an adjunct thereof for providing a period of joint operation of a washer pump with said wiper motor; first control means for providing sole wiper motor operation; second control means for actuating said wiper motor and providing accompanying operation of said coordinating and pumping unit; said coordinating and pumping unit comprising a base plate adapted to be mounted proximate said wiper motor, shaft means journaled on said base plate, means on said shaft means for engagement with the mechanical output of said wiper motor, first cam means mounted on said shaft means for being driven at all times while said wiper motor is in operation, cam follower means mounted in operative engagement with said first cam means and adapted to be driven thereby while said first cam means are driven, a washer pump mounted on said base plate, said washer pump including a solvent chamber with a movable wall and a pump rod operatively coupled to said movable wall, said pump rod including means for providing a lost-motion connection with said cam follower means, a ratchet wheel journaled on said base plate, second cam means adapted to be driven by said ratchet wheel, pawl means on said base plate, linkage means operatively coupling said mechanical output of said wiper motor to said pawl means to cause said pawl means to be driven while said wiper motor is in operation, means for normally preventing said pawl means from driving said ratchet wheel, latch means operatively associated with said pump rod and adapted to be actuated by said second cam means, said latch means in conjunction with said second cam means normally maintaining said pump rod in a position to permit said cam follower means to idle with respect to said pump rod through said lost-motion connection when said means prevent said pawl means from driving said ratchet wheel, and means responsive to the actuation of said second control means for selectively causing said pawl means to drive said ratchet wheel, said second cam means disengaging said latch means in response to movement of said ratchet wheel to permit said cam follower means which are being driven by said shaft means to drive said pump rod to thereby effect pump operation as a result of the rotation of said shaft means effected by said wiper motor, said second cam means reengaging said latch means after a predetermined movement of said ratchet wheel effected by said pawl means, said means for preventing said pawl means from driving said ratchet wheel rendering said pawl means ineffective for driving said ratchet wheel after said second cam means cause said latch means on said pump rod to terminate the driving relationship between said cam follower means and said pump rod.

References Cited in the file of this patent
UNITED STATES PATENTS

| | | |
|---|---|---|
| 2,878,505 | Ziegler | Mar. 24, 1959 |
| 2,905,962 | Ziegler | Sept. 29, 1959 |
| 2,953,802 | Ziegler | Sept. 27, 1960 |
| 2,959,803 | Ziegler | Nov. 15, 1960 |